1

2,930,678

PROCESS FOR THE PRODUCTION OF SELENIUM OF AT LEAST 99.99% PURITY

Bonifaz Oberbacher, Kriftel (Taunus), and Otto Schlier, Frankfurt am Main, Germany, assignors to Norddeutsche Affinerie, Hamburg, Germany No Drawing. Application September 30, 1957
Serial No. 686,889

Claims priority, application Germany October 16, 1956

3 Claims. (Cl. 23—209)

The present invention relates to improvements in the production of extremely pure selenium of 99.99% purity, ularly to an improved distillation process for the recovery of extremely pure selenium.

The normal commercial pure selenium usually has a purity of 99.5% to 99.8% Se and as impurities contains 0.02% to 0.1% Te and also the following elements: Sb, Pb, Al, Ca, Zn, Ni, Au, Ag, Cu, Bi, Fe, As, Si, Mg and Sn, as can be determined spectroscopically under Harvey-conditions. However, the electrochemical industry requires a product of greater purity, for example, for the production of selenium rectifiers, as the presence of foreign substances deleteriously affects the efficiency of such rectifiers.

A normal distillation of selenium according to previously known methods has not been effective for the production of extremely pure selenium of 99.99% purity. In order to produce selenium of this purity it is usually customary to convert the selenium into its oxide, then to sublime such oxide and reducing the sublimed oxide. While a very pure product is obtained by this method, it is costly, troublesome and furthermore engenders losses.

Another known method purifies pure selenium by fractional distillation (see, for example, D. Ashby, J. Electrodepositors' Techn. Soc., 17, 129–146 (1942)).

However, in the fractionation of pure selenium containing about 0.02% of Te in a quartz column with two theoretical plates under vacuum, it is found that the distillate still contains 0.003% Te and in addition the elements Mg, Pb, Si, Fe, Cu, Sb, Bi, Sn and Zn in a quantity of about 0.1% as ascertained by spectroscopic investigation methods in which the intensity is increased by a factor of about 500 over the Harvey-conditions.

According to the invention it was found that when small amounts of magnesium powder are added to commercially pure selenium or crude selenium before distillation or respectively fractional distillation, but otherwise under the same conditions, a significantly purer distillate is obtained. The distillate not only contains substantially smaller quantities of metal impurities but also contains a substantially smaller quantity of tellurium which is normally difficult to remove and furthermore engenders disturbances. The quantity of magnesium powder employed as indicated above is relatively small and preferably amounts to about 0.05 to 2% calculated with reference to the total charge to be distilled. The process according to the invention is not only adapted for the purification of commercially pure selenium, that is, selenium of about 99.5 to 99.8% purity, but also for the purification of crude selenium and it is possible, for example, to obtain a far reaching purification of crude selenium with an 86% selenium content by the addition of about 1% of magnesium powder and distillation. Even purest selenium can be obtained from such crude selenium when employing an apparatus of appropriate separation selectivity. Preferably the distillation according to the invention is carried out under vacuum.

The following examples will serve to illustrate several embodiments of the invention.

*Example 1*

0.5 g. of magnesium powder were added to 100 g. of commercially pure selenium with a 99.65% selenium content and an 0.02% Te content and well mixed. The mixture was then placed in a quartz column of 6 cm.$^2$ cross-section and distilled over at 2 mm. Hg pressure at 430 to 450° C. After 8 hours the distillation was discontinued. 10.5 g. distillation residue remained in the column while 90 g. distillate collected in the condenser. Absolutely no foreign lines were discernable on spectroanalysis of the distillate under Harvey-conditions. With increased intensity spectroscopically the lines of Te, Si, Mg, Cu and very weakly that of Pb could be discerned. The Te content was ascertained as 0.0045% by photometric evaluation of the 2385.76 A. line. The content of the other elements which could be detected qualitatively was considerably less than 0.001%, 0.0001%, 0.0001% and 0.001%, respectively, as they could not be detected under Harvey-conditions.

When using an apparatus with two theoretical plates the purity of the distillate can be increased even further or a commercially pure selenium of lower purity can also be worked up to purest selenium as can be seen from the following example.

*Example 2*

150 g. of commercially pure selenium were mixed with 0.75 g. of Mg powder and stirred in a long necked column for 2 hours at 450° C. at atmospheric pressure. 100 g. of the solidified melt were placed in a quartz apparatus with two theoretical plates and distilled at 450° C. at a pressure of 2 mm. Hg. After 7 hours, 31.5 g. of distillate were obtained, the Te content of which was 0.0008±15%.

Further tests showed that it is possible to purify crude selenium containing about 86% Se to a far reaching extent by the addition of about 1% of Mg powder and distillation. Selenium of highest purity can also be obtained by using an apparatus with a correspondingly greater separation selectivity.

We claim:

1. A process for the purification of impure elemental selenium containing at least 86% of elemental selenium and as an impurity at least one element selected from the group consisting of Pb, Si, Fe, Cu, Sb, Bi, Sn, Zn, Te and As which comprises admixing up to about 2% of magnesium powder with such impure selenium, distilling selenium off from such mixture and collecting a selenium distillate of improved purity.

2. The process of claim 1 in which the quantity of magnesium powder is about 0.05 to 2% of such mixture.

3. The process of claim 1 in which said distillation is carried out under vacuum.

References Cited in the file of this patent

FOREIGN PATENTS 1,010,844     France _____ June 16, 1952

OTHER REFERENCES

Mellor: "Comprehensive Treatise on Inorganic and Theoretical Chemistry," vol. 10, page 751, lines 10 and 11 from the bottom.